Aug. 20, 1963  G. POPOVICH  3,101,010
DRIVE ASSEMBLY
Filed Oct. 1, 1959  2 Sheets-Sheet 1
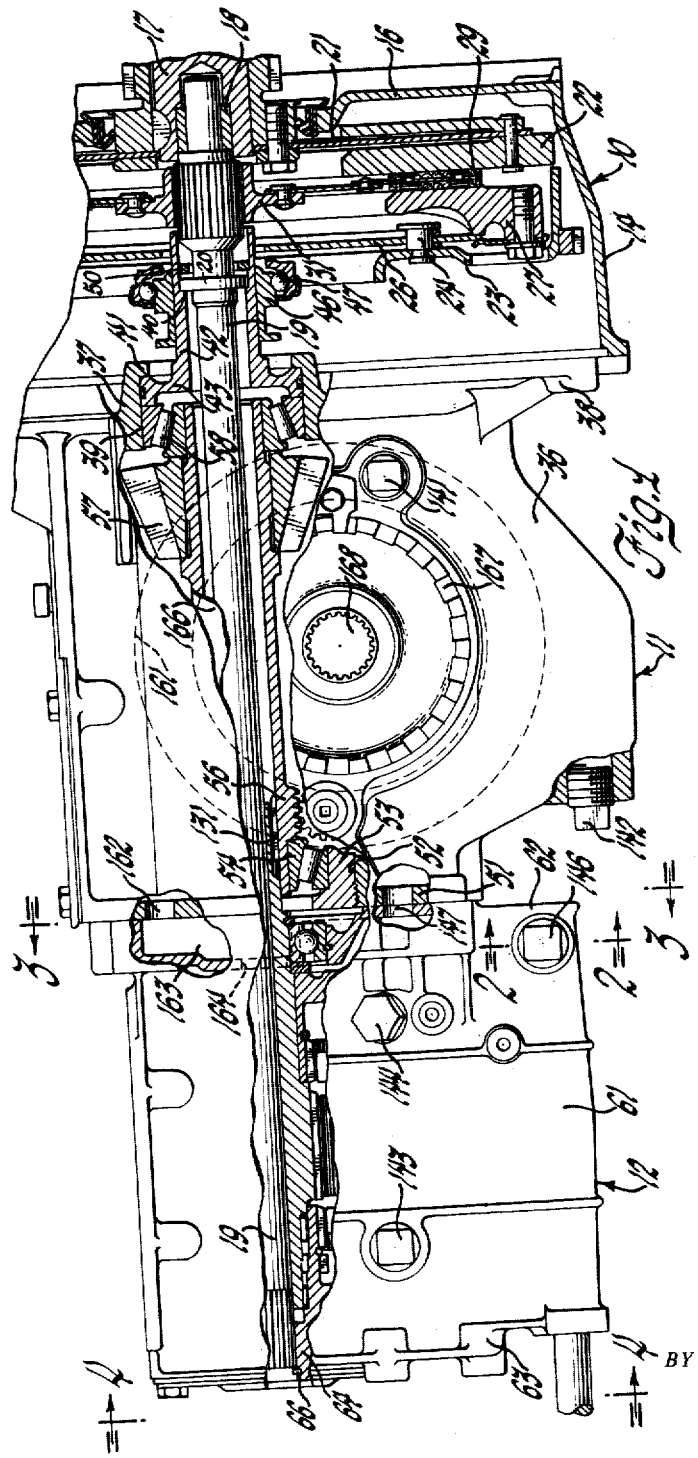
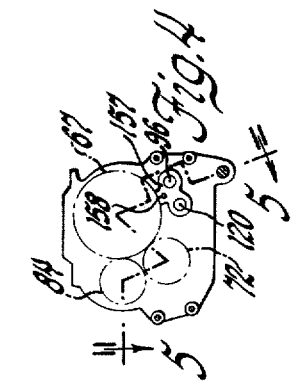
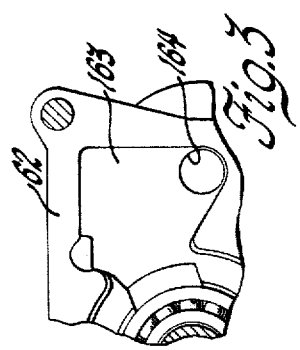
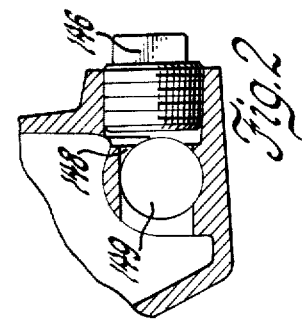
INVENTOR.
George Popovich
BY
A.M. Heiter
ATTORNEY

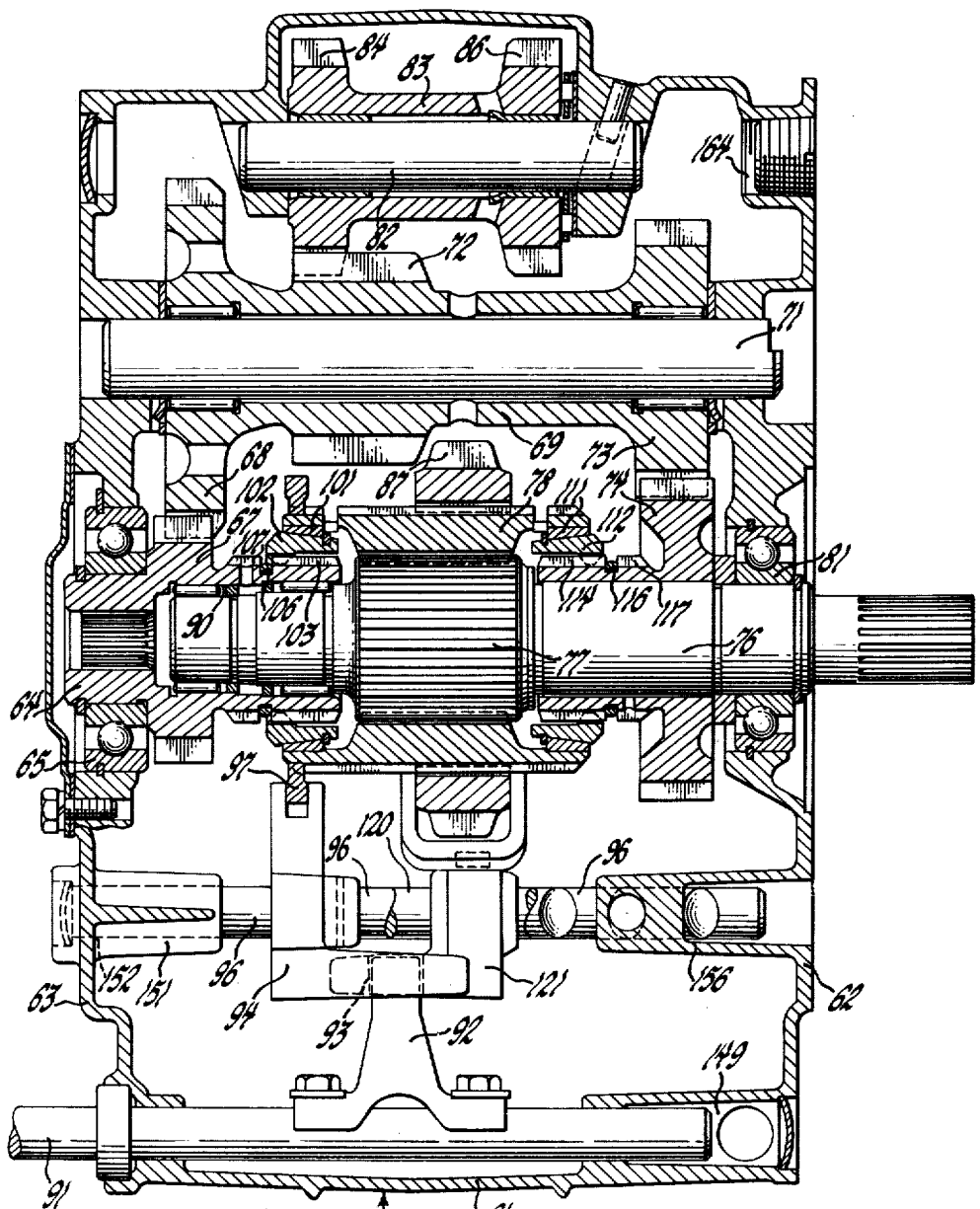

United States Patent Office 3,101,010
Patented Aug. 20, 1963

3,101,010
DRIVE ASSEMBLY
George Popovich, Birmingham, Mich., assignor to General Motors Corporation, Detroit, Mich., a corporation of Delaware
Filed Oct. 1, 1959, Ser. No. 843,681
20 Claims. (Cl. 74—700)

This invention relates to a drive assembly and more particularly to a unitary clutch, differential and transmission assembly.

The drive assembly consists of a manually operated clutch unit for connecting an engine through a differential unit to drive a multiratio transmission which has its output connected to the differential unit. The clutch assembly has an engine driven input member driving a flywheel which provides the clutch backing plate. The clutch driven plate is located between this backing plate and a pressure plate supported on a cover plate attached to the flywheel. The Belleville spring for actuating the pressure plate is pivotally supported on the cover plate and and actuated by a throw-out bearing slidably mounted on a support sleeve. The rear portion of the clutch bell housing is closed by the adjacent wall of the differential housing which also supoprts the clutch support sleeve. The output shaft of the clutch which is rotatably mounted in the input member extends completely through the differential housing and differenial input sleeve shaft and through the transmission housing to the input gear at the far end of the transmission housing. The transmission housing has suitable forward and reverse gearing such as a three-speed and reverse synchromesh transmission and drives an output sleeve shaft located concentrically with the clutch output shaft. The transmission output shaft drives the differential input shaft to which the differential pinion gear is fixed for driving the differential ring gear. An adjustable thrust bearing arrangement rotatably supports and locates the differential input shaft and clamps the clutch support sleeve in position. The clutch housing has a dry sump suitably sealed from the communicating differential and transmission housings which contain oil at a common level. The transmission and differential housings each have filler plugs at the normal oil level and are interconnected by a passage at the same level. The differential ring gear is employed to circulate oil from the differential housing to the tranmission housing to insure that the transmission housing will not be drained of oil. This arrangement makes it possible in a differential and transmission assembly of this character to eliminate oil seals between these units particularly the input and output shafts.

An object of the invention is to provide a unitary differential and transmission gearing assembly providing a simplified low cost unit.

Another object of the invention is to provide a unitary clutch, differential and transmission assembly providing a simplified and compact low cost arrangement of the shafts, gearing and other parts.

Another object of the invention is to provide in a unitary differential and transmission assembly, a common oil supply and oil circulation system within the unit.

Another object of the invention is to provide in a unitary differential and transmission assembly, a common oil supply and circulating system circulating the oil from the differential unit by employing the differential ring gear to throw the oil from the ring gear through a passage into the transmission housing and a return passage for oil flowing under the influence of gravity.

Another object of the invention is to provide in a unitary clutch and differential assembly, a clutch throw-out bearing support sleeve supported and clamped by the differential input shaft thrust bearing adjustment arrangement.

These and other objects of the invention will be more apparent from the following description and drawings of a preferred embodiment of the invention.

FIG. 1 is a side elevation view of the clutch differential and transmission unit with parts broken away and in section to show details.

FIG. 2 is a partial section of FIG. 1 on the line 2—2.

FIG. 3 is a partial section showing oil passages of FIG. 1 on the line 3—3.

FIG. 4 is an end view of the transmission to illustrate the transmission cross section taken on the line 4—4 of FIG. 1.

FIG. 5 is a sectional view of the transmission showing the gearing on the line 5—5 of FIG. 4.

The drive assembly consists of a clutch unit 10, a differential unit 11 and a transmission unit 12 arranged as viewed in FIG. 1 to provide a compact and rigid unitary drive assembly particularly suited for rear engine rear drive vehicles. The clutch assembly 10 has a bell housing 14 having an input end wall 16 which, as shown in S.N. 840,590, entitled "Frame Assembly for Internal Combustion Engines," filed September 17, 1959 by Adelbert E. Kolbe, which matured into Patent 2,974,660, may be attached to an engine around the engine output shaft or clutch input member 17. The input member 17 has a bearing in bore 18 to rotatably support the clutch output shaft 19 and is also connected by suitable means such as a flex plate 21 to the flywheel 22 as described in more detail in S.N. 840,583, entitled "Internal Combustion Engine Flywheel," filed September 17, 1959 by Adelbert E. Kolbe, now Patent 2,982,150. The clutch unit 10 as shown in detail in S.N. 843,685, entitled "Power Plant," filed October 1, 1959 by Joseph F. Hein and Robert G. Renius, has a cover plate 23 secured to the flywheel 22 and having pivot members 24 pivotally supporting the Belleville spring 26. The pressure plate 27 is supported on the cover plate 23 for rotation with the cover plate and flywheel and is moved axially by the Belleville spring 26 to engage the clutch driven plate 29 located between the pressure plate 27 and the backing plate portion of the flywheel 22. The driven plate 29 has a hub portion 31 to connect the driven plate to the clutch output shaft 19.

The differential unit 11 has a housing 36 having an input end wall 37 adjacent the clutch having a portion 38 extending beyond the main part of the differential housing 36 to provide an output end wall for the bell housing 14. The center portion of this wall has a bore 39 having a shoulder 41 at the end in the clutch. The clutch support sleeve 42 has a shoulder 43 fitting in the bore 39, suitably sealed thereto engaging the shoulder 41. The portion of sleeve 42 within the clutch housing 14 supports the clutch actuating sleeve 46 which is actuated by a fork in the usual manner and a throw-out bearing 47 which actuates the Belleville spring 26.

The differential housing 36 has an output end or transmission end wall 51 having a threaded bore 52 in which the adjusting sleeve 53 is sealed and rotated to apply an adjustable thrust to the thrust bearing 54 which rotatably supports the differential input shaft 56. The differential pinion 57 is splined to the shaft 56 and shaft 56 is rotatably mounted at the other end on the thrust bearing 58 located in the bore 39. The adjusting sleeve 53 is tightened to push bearing 54 against a shoulder on shaft 56 and another shoulder on shaft 56 against pinion 57 which clamp bearing 58 and flange 43 to shoulder 41 to position and secure both the bearings 54 and 58 and pinion 57 on the shaft 56, the support sleeve 42 in the bore 39, and to locate and secure each of these parts. The oil seal 20 is located between the clutch output shaft 19 and the inner wall of the support sleeve 42. An integral shoulder 40 and a removable shoulder or ring 50 are mounted adjacent the oil seal on the inner wall of the support sleeve to locate and prevent injury to the oil seal during disassembly.

The transmission 12 has a housing 61 having an input and output wall or differential end wall 62 and a wall 63. The input shaft 19 extends completely through the transmission housing 61 and is splined to the input member 64, the snap ring 66 limiting or preventing the shaft from moving further through the member 64. The input member 64 (FIG. 5) is rotatably supported by bearing 65 on the input wall 63 and has an input gear 67 driving the driven gear 68 of the countershaft cluster gear 69 which is rotatably mounted by suitable bearings on the countershaft 71. The cluster gear 69 also includes a first speed gear 72 and a second speed gear 73, which meshes with a second speed output gear 74 rotatably mounted on the output sleeve shaft 76 surrounding the input shaft. The shaft 76 has a splined hub 77 on which the collar 78 of the second-third speed synchronizing mechanism is axially slidable. The output shaft 76 is rotatably mounted and axially positioned in a bearing 81 on the rear wall 62, and by bearings in bore 90 in member 64. The reverse countershaft 82 supports the reverse gear cluster 83 which has an input idler 84 meshing with the countershaft gear 72 and an output idler 86. The axially movable reverse and first output gear 87 is splined to the outside of collar 17 to drive the collar and output shaft.

When the control rod 91 is rotated counterclockwise as viewed in FIG. 5 in the bores in the case so that the finger 92 engages the slot 93 into the second-third shift fork 94, reciprocal movement of the rod will move the fork and the rail 96 to act through the ring 97 to move the collar 78 either to second or third ratio position. Movement to the left of the rod 91 will move the collar 78 to the left so that the synchronizing cone 101 on collar 78 engages the synchronizing cone 102 axially slidably mounted on splines 103 on the input member 64. The annular spring 106 retards movement of cone 102 to initiate synchronization so that the teeth on member 102 will engage teeth 107 to effect synchronization so that the internal teeth on collar 78 will be aligned with splines 103 for engagement of third ratio.

Similarly when the shaft 91 is moved to the right as viewed in FIG. 5, the fork 94 will move the collar 78 to the right so that the synchronizing cone 111 engages the cone 112 which is connected by splines 114 to the second speed gear 74. Movement of the cone member 112 past the detent spring 116 starts synchronization and when the splines of cone 112 engage the spline 117 there is synchronization so that the internal splines on the collar 78 may engage the splines 114 to provide second speed drive from the countershaft gear 73, gear 74, through the synchronizing splines 114 and collar 78 and splines 77 to the output shaft 76.

For first and reverse control shaft 91 is rotated in the opposite direction so that the tongue 92 engages a slot like slot 93 in the fork 121 fixed on the first reverse rail 120, which may move the gear 87 axially on the collar 78, either to the left to engage the first ratio countershaft gear 72 to provide first ratio drive from the countershaft through gear 87 and collar 78 to the output shaft 76, or to the right to engage gear 86 to connect the reverse idler 86 through the collar 78 to the output shaft 76 to provide reverse drive.

The transmission output shaft 76 extends through the bearing 81 and is connected by suitable splines 131 to the internal bore of the differential input shaft 56 to drive the differential unit.

The common lubrication system for the transmission and differential portion of this unit permits the omission of seals between these individual units. The differential unit 11 has a filler plug 141 and a drain plug 142. The transmission unit 12 has filler plugs 143 and 144 and a drain plug 146. It will be noted that the filler plugs are preferably located on a horizontal line just above the oil level intended to be used in these units and that a suitable passage 147 is provided through both the differential end wall 62 of the transmission housing 61 and the transmission end wall of the differential housing 147. The transmission drain plug 146 is located in the lower motor portion of the transmission at a point where the bore 148 in which the plug 146 is secured by means of threads extends transversely through a bore 149 for the control shaft 91 to prevent trapping of fluid in the bore 149 which would interfere with the movement of the control shaft 91. The shift rails, such as shift rail 96, are supported in bores 151 at the wall 63 which is vented by a passage 152 to prevent accumulation of fluid which would interfere with movement of the shift rail. At the wall 62 the rails, such as rail 96, are separately mounted in bores 156 which, as shown in FIG. 4, communicate at the end with a depressed portion 157 in the wall which is connected by a passage 158 to the inside of the transmission housing 61 to prevent accumulation of fluid in these bores which would interfere with the operation of the rails.

Lubricant is circulated from the differential housing 36 by the action of the differential ring gear 161 which slings or throws the oil tangentially from the upper portion of the ring gear to impinge on the wall 51 in line with the aperture 162 so that a substantial portion of the oil flows through the aperture 162 to a cavity 163 shown in FIGS. 1 and 3 in the wall 62 where it flows downwardly and through an aperture 164 into the transmission housing. It will be noted that the aperture 164 is also used to permit assembly and disassembly of the reverse countershaft 82. The ring gear 161 is supported on a differential carrier 166 supported by suitable bearings located by the adjustable thrust collar 167 and driving through pinions, not shown, the differential output shaft 168 and a similar output shaft on another side as shown in detail in S.N. 843,684, entitled "Differential Assembly," filed October 1, 1959, by Thomas P. Cote and Edward L. Nash.

The above described preferred embodiment is illustrative of the invention which it will be appreciated may be modified within the scope of the appended claims.

I claim:

1. In a transmission and differential assembly, a housing structure having a differential chamber and a transmission chamber and a dividing wall, a drive shaft extending through said dividing wall, bearing means mounted on said dividing wall and rotatably supporting said drive shaft, an oil port in said dividing wall at the normal common oil level in said differential and transmission chambers connecting said chambers, a gear in one of said chambers operating partially submerged in oil and throwing oil directly against said dividing wall, a passage in said dividing wall located to receive oil thrown by said gear and extending to the other chamber to deliver oil from said one to said other chamber to circulate the oil in said chambers.

2. The invention defined in claim 1 and said gear being the differential ring gear located in said differential chamber.

3. The invention defined in claim 1 and said passage including a downwardly extending pocket located in said dividing wall, a first opening in the surface of said dividing wall facing the edge of said gear communicating with said downwardly extending pocket to receive oil thrown by said gear located at the upper portion of said dividing wall and transfer the oil to said downwardly extending pocket, and a second opening offset from said first opening and extending into the other chamber.

4. The invention defined in claim 1 and filler plugs in said housing extending into each chamber on a horizontal line extending through said port to insure a normal common oil level for both chambers.

5. In a transmission assembly, a clutch and gear housing having clutch and gear chambers and a dividing wall having a bore between said chambers, clutch means in said clutch chamber including a throw-out bearing support sleeve having a securing part fitting into said bore, stop means to limit movement of said securing part and support sleeve toward said clutch chamber, a first shaft located in said gear chamber, a first and second thrust bearing on said shaft, spacer means on said shaft limiting movement of said bearings toward the center of said shaft, said first bearing being located in said bore and abutting said securing part, thrust adjusting means mounted on said housing spaced from said dividing wall and engaging said second bearing and urging said second bearing into contact with said spacer means, said spacer means into contact with said second bearing, said second bearing into contact with said securing part and said securing part into contact with said stop means to locate and secure said shaft and support sleeve.

6. The invention defined in claim 5 and said spacer means including a land on said first shaft and a gear positioned between said land and said first bearing.

7. The invention defined in claim 5 and said first shaft being a sleeve shaft and said clutch including a clutch output shaft extending coaxially through said support sleeve and said first shaft.

8. The invention defined in claim 5 and said first shaft being a sleeve shaft and said clutch including a clutch output shaft extending coaxially through said first shaft and through said housing, a transmisison driven by said clutch output shaft and having an output sleeve shaft coaxially surrounding said first shaft and splined for a driving connection permitting relative axial movement to said first shaft.

9. In a clutch and differential assembly, a clutch and differential housing having clutch and differential chambers, a dividing wall and a differential chamber end wall, an input member in said clutch chamber, said dividing wall of said housing having a bore having a shoulder at the clutch chamber end, a clutch output shaft rotatably supported in said input member and extending through said clutch differential chambers and rotatably supported in said differential chamber end wall, clutch means connecting and disconnecting said input member and clutch output shaft including a throw-out bearing supporting sleeve having a flange fitting in said bore and against said shoulder, a differential input sleeve shaft located concentrically around said clutch output shaft, a first rotary and thrust bearing fitting in said bore and engaging said flange to hold said flange against said shoulder and rotatably supporting one end of said differential input sleeve shaft, a second rotary and thrust bearing adjustably mounted on said transmisison end wall of said differential housing and rotatably supporting the other end of said differential input sleeve shaft, spacer means on said differential input sleeve shaft to space said first and second bearings, and adjustable means to preload said thrust bearings to accurately locate said differential sleeve shaft and the pinion gear located thereon and said clutch throw-out bearing sleeve support.

10. In a clutch and differential assembly, a clutch having a bell-shaped housing having an input end wall and an opened output end, a differential housing having a clutch end wall closing the output side of said clutch bell housing and a transmission end wall, an input member at the input end wall of said clutch housing, said clutch end wall of said differential housing having a bore having a shoulder at the clutch housing end, a clutch output shaft rotatably supported in said input member and extending through said clutch housing and said differential housing and rotatably supported in said transmission end wall of said differential housing, clutch means connecting and disconnecting said input member and clutch output shaft including a throw-out bearing supporting sleeve having a flange fitting in said bore and against said shoulder, a transmission output shaft located concentrically around said clutch output shaft, transmission means connecting said clutch output shaft to said transmission output shaft providing a plurality of ratios, a differential input sleeve shaft located concentrically around said clutch output shaft, a first rotary and thrust bearing fitting in said bore, engaging said flange to hold said flange against said shoulder and rotatably supporting one end of said differential input sleeve shaft, a second rotary and thrust bearing adjustably mounted on said transmission end wall of said differential housing and rotatably supporting the other end of said differential input sleeve shaft, spacer means on said differential input sleeve shaft to space said first and second bearings, and adjustable means to preload said thrust bearings to accurately locate said differential sleeve shaft and the pinion gear located thereon and said clutch throw-out bearing sleeve support.

11. In a drive assembly, a clutch housing having an input end wall and an open output end, a differential housing having a clutch end wall attached to and closing the output end of said clutch housing and a transmission end wall, a transmission housing secured to said transmission end wall of said differential housing, an input gear rotatably mounted on the other wall of said transmission housing, an input member extending through said input end wall of said clutch housing, a clutch output shaft rotatably mounted in said input member and extending through said differential housing and into said transmission housing and drivingly connected to said transmission input gear, clutch means connecting and disconnecting said input member and said clutch output shaft, a transmission output sleeve shaft concentrically mounted around said clutch output shaft and rotatably mounted in said transmission input gear and in said one transmission wall, multiple ratio gear means connecting said input member to said output sleeve shaft to provide a plurality of ratio drives, a differential input sleeve shaft located concentrically around said clutch output shaft driven by said transmission output shaft, a differential pinion gear fixed to said differential input shaft, and a differential unit mounted on a transverse axis having a ring gear meshing with said pinion gear.

12. In a drive assembly, a clutch housing having an input end and an open output end, a differential housing having a clutch end wall attached to and closing the output end of said clutch housing and a transmission end, a transmission housing having one end secured to said transmission end of said differential housing, a dividing wall between said differential and transmission housings, an input gear rotatably mounted at the other end of said transmission housing, an input member extending into said clutch housing, a clutch output shaft rotatably mounted in said input member extending through said differential housing and into said transmission housing and drivingly connected to said transmission input gear, clutch means connecting and disconnecting said input member and said clutch output shaft, a transmission output sleeve shaft concentrically mounted around said clutch output shaft and rotatably mounted in said transmission input gear and in said dividing wall, multiple ratio gear means connecting said input member to said output sleeve shaft to provide a plurality of ratio drives, a differential input sleeve shaft located concentrically around said clutch output shaft driven by said transmission output shaft, a differential pinion gear fixed to said differential input shaft, a differential unit mounted on a transverse axis having a ring gear meshing with said pinion gear, a transmission filler plug in said transmission housing, a passage between said transmission housing and said differential housing and an oil filler plug in said differential housing all located on a horizontal line, an aperture in said dividing wall of said differential housing substantially aligned with a tangent from the upper portion of said differential ring gear and leading into said transmission housing.

13. In a drive assembly, a clutch housing having an input end wall and an open output end, a differential housing having a clutch end wall attached to and closing the output end of said clutch housing and a transmission end wall, a transmission housing having one wall secured to said transmission end wall of said differential housing, an input gear rotatably mounted on the other wall of said transmission housing, an input member extending through said input end wall of said clutch housing, a clutch output shaft rotatably mounted in said input member and extending through said differential housing and into said transmission housing and drivingly connected to said transmission input gear, clutch means connecting and disconnecting said input member and said clutch output shaft, a transmission output sleeve shaft concentrically mounted around said clutch output shaft and rotatably mounted in said transmission input gear and in said one transmission wall, multiple ratio gear means connecting said input member to said output sleeve shaft to provide a plurality of ratio drives, a differential input sleeve shaft located concentrically around said clutch output shaft driven by said transmission output shaft, a differential pinion gear fixed to said differential input shaft, a differential unit mounted on a transverse axis having a ring gear meshing with said pinion gear, a transmission filler plug in said transmission housing, a passage between said transmission housing and said differential housing and an oil filler plug in said differential housing all located below the center line of the transmission housing on a horizontal line, an aperture in the transmission end wall of said differential housing substantially aligned with a tangent from the upper portion of said differential ring gear, and a passage formed in said one wall of said transmission housing behind said aperture leading downwardly and into said transmission housing.

14. In a transmission and differential assembly, a housing structure having a differential chamber and a transmission chamber and a transverse dividing wall, a drive shaft having a portion located in said differential and transmission chambers and extending through said dividing wall, bearing means mounted on said dividing wall and rotatably supporting said drive shaft, an oil port in said dividing wall at the normal common oil level in said differential and transmission chambers connecting said chambers, transmission gearing in said transmission chamber mounted coaxially with said drive shaft having transmission gears partially submerged in oil to sling oil to all transmission gearing, a differential gear mounted on an axis transverse to said drive shaft in said differential housing driven by said transmission gearing and operating partially submerged in oil and throwing oil directly against said dividing wall, a passage in said dividing wall located to receive oil thrown by said differential gear and extending to said transmission chamber to deliver oil from said differential to said transmission chamber to circulate the oil in said chambers.

15. In a drive assembly, a housing structure having a first chamber and a second chamber and a dividing wall, a drive shaft having a portion located in said first and second chambers and extending through said dividing wall, bearing means mounted on said dividing wall and rotatably supporting said drive shaft, an oil port in said dividing wall at the normal common oil level in said first and second chambers connecting said chambers, drive means in said first chamber having parts partially submerged in oil at said normal common oil level to sling oil on said drive means to lubricate said drive means, a gear mounted on an axis transverse to said dividing wall and to said drive shaft in said second housing operating partially submerged in oil at said normal common oil level and throwing oil directly against said dividing wall, a passage in said dividing wall located to receive oil thrown by said gear and extending to the first chamber to deliver oil from said second to said first chamber to circulate the oil in said chambers.

16. In a drive assembly; a housing structure having a clutch chamber, a differential chamber and a transmission chamber, a first dividing wall between said clutch and differential chambers having a support sleeve extending into said clutch chamber, and a second dividing wall between said differential and transmission chambers; a drive shaft having a portion located in said clutch, differential and transmission chambers and extending through said support sleeve of said first dividing wall and said second dividing wall, sealing means sealing said drive shaft to said support sleeve, a driven sleeve shaft surrounding said drive shaft, bearing means mounted on said dividing walls rotatably supporting said sleeve shaft, an oil port in said dividing wall at the normal common oil level in said differential and transmission chambers connecting said chambers, transmission gearing in said transmission chamber connecting said drive shaft to said sleeve shaft mounted coaxially with said drive shaft having transmission gears partially submerged in oil to sling oil on all transmission gearing, a gear mounted on an axis transverse to said drive shaft in said differential housing driven by said transmission gearing and operating partially submerged in oil and throwing oil against said dividing wall, a passage in said dividing wall located to receive oil thrown by said gear and extending to the other chamber to deliver oil from said one to said other chamber to circulate the oil in said chambers.

17. In a transmission assembly, a clutch and gear housing having clutch and gear chambers and a dividing wall having a bore between said chambers, clutch means in said clutch chamber including a throw-out bearing support sleeve having a securing part fitting into said bore, stop means to limit movement of said securing part and support sleeve toward said clutch chamber, a first sleeve shaft located in said gear chamber, a first and second thrust bearing on said first shaft, spacer means on said first shaft limiting movement of said bearings toward the center of said shaft, said first bearing being located in said bore and abutting said securing part, thrust adjusting means mounted on said housing spaced from said dividing wall and engaging said second bearing and urging said second bearing into contact with said spacer means, said spacer means into contact with said second bearing, said second bearing into contact with said securing part and said securing part into contact with said stop means to locate and secure said first shaft and support sleeve, a second shaft located within said support tube and said first sleeve shaft, a seal between said support sleeve and second shafts, means in said gear housing axially locating said second shaft during normal operation, and means on said support sleeve limiting movement of said second shaft in said support sleeve to movement in one direction to prevent improper disassembly.

18. In a transmission assembly, a clutch, differential and gear housing having clutch, differential and gear chambers and a first dividing wall having a bore between said clutch and differential chambers and a second dividing wall between said differential and gear housing, clutch means in said clutch chamber including a throw-out bearing support sleeve having a securing part fitting into said bore, stop means to limit movement of said securing part and support sleeve toward said clutch chamber, a first sleeve shaft located in said gear chamber, a first and second thrust bearing located in spaced relation on said first shaft, said first bearing being located in said bore and abutting said securing part, thrust adjusting means mounted on said second wall engaging said second bearing and urging said second shaft and said second bearing into contact with said securing part and said securing part into contact with said stop means to locate and secure said first shaft and support sleeve, a second shaft located within said support tube and first sleeve shaft, a seal between said support sleeve and second shaft, means in said gear housing axially locating said second shaft during normal operation and means on said support sleeve limiting movement of said second shaft in said support sleeve to movement in one direction to prevent improper disassembly.

19. In a transmission assembly, a clutch, differential and gear housing having clutch, differential and gear chambers, and a first dividing wall having a bore between said clutch and differential chambers and a second dividing wall having an aperture above and an aperture at the normal liquid level between said differential and gear housing, clutch means in said clutch chamber including a throw-out bearing support sleeve having a securing part fitting into said bore, a first shaft in said differential chamber, a first and second thrust bearing means rotatably supporting said first shaft on said walls and securing said support sleeve in said bore, a second shaft located within said support sleeve and first shaft, a seal between said support sleeve and second shaft to completely seal said first dividing wall, means in said gear housing axially locating said second shaft during normal operation, means on said support sleeve limiting movement of said second shaft in said support sleeve to movement in one direction to prevent improper disassembly, and gear means in said differential chamber throwing oil through said aperture above the liquid level to said gear chamber.

20. In a drive assembly, a clutch housing having an input end and an open output end, a differential housing having a clutch end with a first wall attached to and closing the output end of said clutch housing and a transmission end, a transmission housing having one end secured to said transmission end of said differential housing, a second wall between said differential and transmission housings, an input gear rotatably mounted at the other end of said transmission housing, an input member extending into said clutch housing, a clutch output shaft rotatably mounted in said input member extending through and sealed to said first wall and into said differential housing and transmission housing and drivingly connected to said transmission input gear, clutch means connecting and disconnecting said input member and said clutch output shaft, a transmission output sleeve shaft concentrically mounted around said clutch output shaft and rotatably mounted in said transmission input gear and in said dividing wall, multiple ratio gear means connecting said input member to said output sleeve shaft to provide a plurality of ratio drives having gears facing a portion located below the normal oil level to distribute oil to all transmission gearing, a differential input sleeve shaft located concentrically around said clutch output shaft driven by said transmission output shaft, bearing means on said second wall permitting passage of oil through said wall rotatably supporting said output sleeve shaft and differential input sleeve shaft, a differential pinion gear fixed to said differential input shaft, a differential unit mounted on a transverse axis having a ring gear meshing with said pinion gear and having a portion below the normal oil level, a passage between said transmission housing and said differential housing and an oil filter plug in said housing located at the normal horizontal oil level, an aperture in said dividing wall of said differential housing substantially aligned with a tangent from an upper portion of said differential ring gear leading into said transmission housing to maintain oil in said transmission housing when said unit is inclined.

References Cited in the file of this patent
UNITED STATES PATENTS

| | | |
|---|---|---|
| 2,111,847 | Eason | Mar. 22, 1938 |
| 2,517,913 | Nickle | Aug. 8, 1950 |
| 2,608,273 | Roos | Aug. 26, 1952 |
| 2,641,346 | Risk et al. | June 9, 1953 |
| 2,743,789 | Ferguson et al. | May 1, 1956 |
| 2,751,798 | Keese et al. | June 26, 1956 |
| 2,822,705 | Orr et al. | Feb. 11, 1958 |
| 2,838,958 | Redman et al. | June 17, 1958 |
| 2,860,726 | Thomas, et al. | Nov. 18, 1958 |
| 2,913,064 | Ferguson et al. | Nov. 17, 1959 |

UNITED STATES PATENT OFFICE
CERTIFICATE OF CORRECTION

Patent No. 3,101,010                                            August 20, 1963

George Popovich

It is hereby certified that error appears in the above numbered patent requiring correction and that the said Letters Patent should read as corrected below.

Column 1, line 25, for "supoprts" read -- supports --; column 10, line 20, for "filter" read -- filler --.

Signed and sealed this 7th day of April 1964.

(SEAL)
Attest:

ERNEST W. SWIDER

Attesting Officer

EDWARD J. BRENNER

Commissioner of Patents